Figure 1:
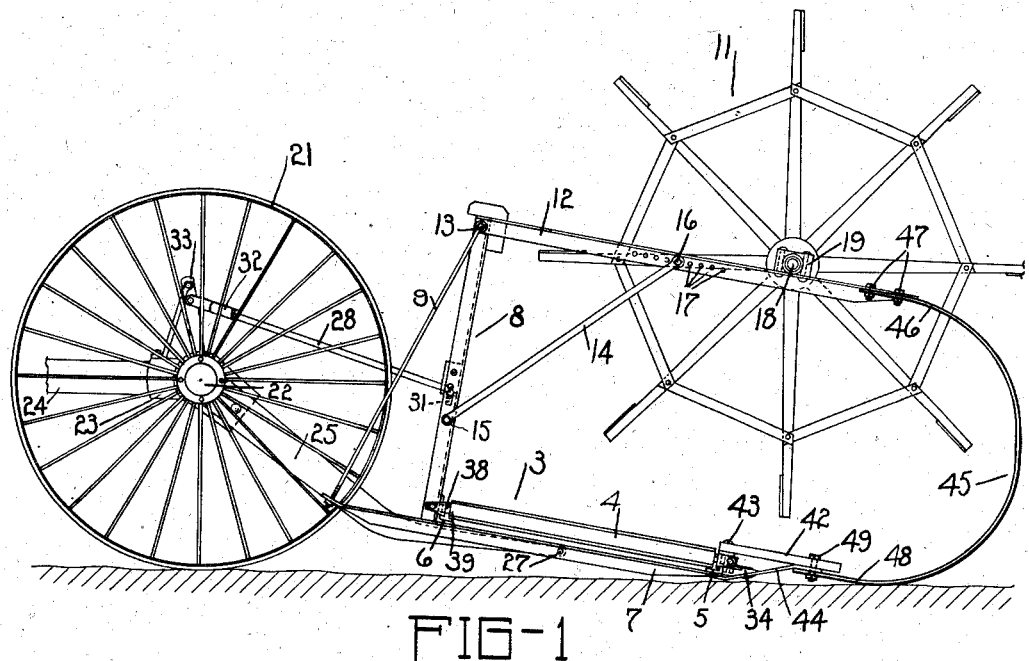

May 23, 1933. P. L. HANS 1,910,950
HARVESTER
Filed Aug. 1, 1929

WITNESS
Walter Ackerman

INVENTOR
Prentice L. Hans.
BY
Brown, Jackson, Boettcher & Diemer
ATTORNEYS

Patented May 23, 1933

1,910,950

UNITED STATES PATENT OFFICE

PRENTICE L. HANS, OF MOLINE, ILLINOIS, ASSIGNOR TO DEERE & COMPANY, OF MOLINE, ILLINOIS, A CORPORATION OF ILLINOIS

HARVESTER

Application filed August 1, 1929. Serial No. 382,781.

This invention relates to harvesters and more particularly to a divider attachment therefor.

In harvesting vine crops and particularly a vine crop of soy beans, it is exceedingly difficult, if not impossible, to cut a vine crop of this type when using a grain divider such as is ordinarily provided at the far end of the platform of a harvester. The ordinary grain divider instead of dividing the vines, picks the vines off the ground and permits them to slide above the divider and against the rear wind-board of the platform. Since many of the vines so picked up by the divider may have root beyond the platform, the platform soon becomes congested and frequent stopping and clearing thereof becomes necessary.

The present invention avoids this difficulty by providing an attachment which instead of attempting to pick up the vines and separate them, as is done by the ordinary grain divider, actually presses the vines down, so that the sickle, which is normally as close to the ground as possible in harvesting soy beans, is given an opportunity to cut the vines which project above it and within the path of the platform without the possibility of vines which may have root beyond the platform running over the divider and congesting the platform. According to the preferred form of the present invention, the divider is made of spring material being connected at one end to the ordinary grain divider support and at the other to the outer reel supporting member in such manner that in operation it projects forwardly and downwardly of the platform, running over the vines and separating or dividing them by forward and downward pressure. No disconnection thereof is necessary when the reel is adjusted for elevation.

The main object of this invention is the provision of a divider attachment for the outer end of the platforms of harvesters which will divide by downward pressure.

Another object is the provision of a resilient or spring divider attachment which will divide by exerting a forward and downward pressure.

A further object is to provide a resilient divider attachment which may be secured to the platform and the outer reel support.

Another object is to provide a resilient divider attachment which will divide vines in such a manner as to prevent congestion on the platform of a binder.

A further object is to provide a resilient divider attachment which may be secured to the regular grain divider at the outer end of the platform of a harvester and to the outer reel supporting arm without the necessity of disconnection when the reel is adjusted for elevation.

Figure 2:
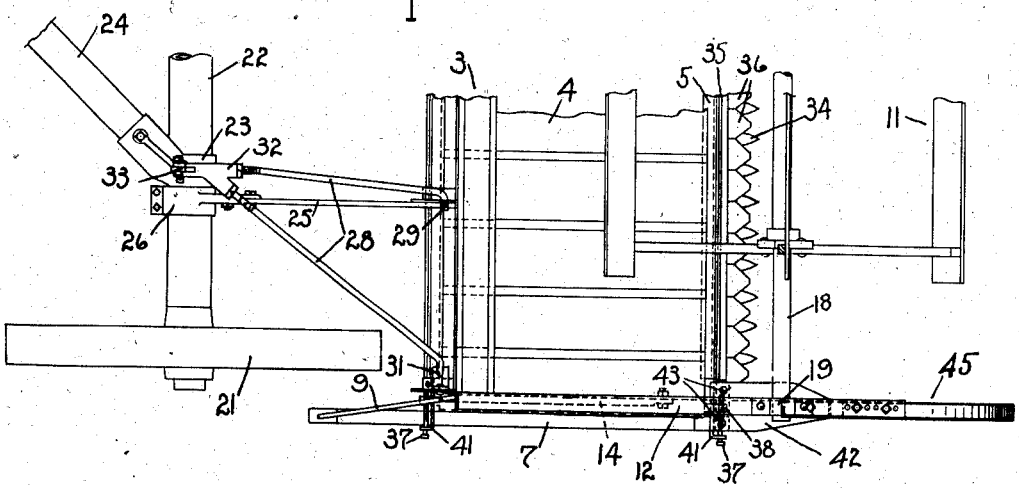

Further objects and advantages will appear in the detailed description of the invention which follows. In the drawing accompanying this description:

Figure 1 is an end view of a combine platform showing the reel and supporting wheel, and the resilient divider attached in position on the platform and reel support; and Figure 2 is a fragmentary plan view of the parts shown in Figure 1.

As illustrated in the drawing, the platform 3 comprises the usual conveyor 4 carried by a framework comprising the front transverse angle iron support or track 5, rear support or track 6 and two or more longitudinal supports 7. The rear windboard 8 is supported upon the rear support 6 of the platform and is braced by rods or braces 9.

The reel 11 is supported on two or more forwardly projecting supports, one of which, 12, is shown. This support is pivotally connected at 13 at its rear end to the upper part of the wind-board 8 and is held in fixed position by a brace rod 14, which is pivoted at its lower end to the lower part of the windboard 8 as indicated at 15, and is removably secured to the reel support member 12 by a removable bolt 16 passing through any one of a series of recesses 17 in the reel support member 12 for adjusting the elevation of the reel 11. The reel trunnion 18 is supported in a bearing 19 on the support member 12.

A carrying wheel 21 is mounted at one end of a supporting axle 22, upon which a bracing bracket 23 is pivoted, the latter forming a member to which a rearwardly extending brace member 24 is connected. The platform 3 is carried by a forwardly projecting arm 25 fixed on the axle at 26 at its rear end and pivoted at its front end at 27 to approximately the center of the conveyor frame. The angular position of the platform is controlled by rods 28 pivotally connected at their front ends to the wind-board 8 at 29 and 31 and at their rear ends to a member 32, pivotally secured to an arm 33 on bracket 23. It is to be understod that while one of each of the supporting members and braces is shown, a plurality of these are usually employed.

For cutting soy beans, the regular grain finger guards are removed and special soy bean guards 34 are substituted. These guards are suitably secured to the support member 35, which is in turn bolted to the front transverse frame member 5. A conventional reciprocating sickle 36 is placed in position on the soy bean guards.

The tension of the conveyor 4 may be adjusted by means of adjusting screws 37 which thread through the ends of the shaft 38 carrying the end roller 39, and are carried by brackets 41, fixed to angle irons 6 and 5.

The conventional grain divider, which is removed when the present device is used, is ordinarily mounted on a divider board or support 42, which is secured by means of bolts 43 to the forward frame member 5 and projects forwardly therefrom. The divider board or support 42 is braced by means of member 44.

The structure which forms the subject matter of the present invention comprises a spring divider 45. This divider is made of a single piece of strap iron bent approximately into a semi-circle, as clearly shown in Figure 1, the upper end 46 of which is bolted at 47 to the outer end of the reel supporting member 12 and the lower end 48 of which is secured to the usual divider board or support by means of a bolt 49 passing through the divider board or support, its brace and the end of the divider.

In operation, the new divider member 45, presses the vines down with resilient pressure, thereby preventing the vines from climbing the platform and congesting it. The sickle will cut all vines which project above the platform and inside of the divider.

It will thus be seen that the dividing attachment herein disclosed divides in a novel way by exerting a resilient forward and downward pressure instead of merely wedging its way through the crop, and it is believed that this method of dividing is novel.

It is to be further noted that owing to its resiliency this new divider need not be removed when the reel is being adjusted for elevation, which adjustment is effected, as heretofore described, by moving the position of the bolt 16 from one to any other of the recesses 17 in the reel supporting member 12.

While the form of the device herein disclosed constitutes a preferred embodiment of the invention, it is to be understood that other forms might be adopted, all coming within the scope of the appended claims.

What I claim and wish to secure by Letters Patent is:

1. The combination with a harvester having a divider support and a reel support, of dividing means connected directly with the divider support and with the reel support, and extending forwardly of said supports.

2. The combination with a harvester having a divider support and a reel support, of resilient dividing means connected directly with the divider support and with the reel support, and extending forwardly of said supports.

3. The combination with a harvester having a divider support and a reel support, of flexible dividing means connected directly to the divider support and to the reel support, and adapted to engage a crop with a forward pressure.

4. The combination with a harvester having a divider support and a reel support, of flexible dividing means connected directly to the divider support and to the reel support, and having a forwardly and upwardly inclined surface adapted to engage a crop with a downward pressure.

5. The combination with a harvester having a divider support and a reel support, of yieldable, forwardly and downwardly extending dividing means secured directly to the divider support and to the reel support and having an inclined surface adapted to engage a crop with a forward and downward pressure.

6. In a machine of the class described, the combination of a divider support, an adjustable reel support and a divider secured to both said supports, said divider being resilient to permit of adjustment of the reel support without removal of the divider.

7. In a machine of the class described, the combination of a divider support, an adjustable reel support and a divider secured to both said supports, said divider comprising a U-shaped resilient member with the intermediate portion thereof extending forwardly of said supports.

8. The combination with a harvester having an adjustable reel support and a divider support, of dividing means comprising a substantially U-shaped resilient member, the leg portions of which are secured to said reel support and divider support, the intermediate portion of said dividing means extending forwardly of said supports to engage a crop with a forward and downward pressure and accommodating itself to adjustments of said reel support.

9. The combination with a harvester having an adjustable reel support and a divider support of dividing means associated with said supports and comprising a continuous, substantially U-shaped resilient strip of metal having one of its ends secured to said reel support with the other end secured to said divider support, the intermediate bowed portion of said strip extending forwardly of said supports to engage a crop with a forward and downward pressure, the strip being maintained under flexion in operative position whereby adjustments of said reel support will be accommodated.

10. The combination with an agricultural implement having spaced supporting bars of a resilient dividing strip having its ends secured to said bars and its intermediate portion bowed outwardly and downwardly to contact with the ground to exert a downward pressure on a crop.

11. The combination with a harvesting implement having vertically spaced supports of a resilient dividing strip having its ends secured to said supports and its intermediate portion bowed forwardly and outwardly and extending downwardly in advance of said supports and contacting the ground and crop to exert a downward pressure thereon.

12. The combination with a harvesting implement having spaced supports, of a resilient crop dividing strip secured to said supports, certain of said supports being adjustably mounted on said implement, and said dividing strip being of greater length than the maximum possible distance between said supports whereby adjustment of said supports is effected without removing said dividing strip.

13. The combination with a harvester having a reel support and a divider support, of a U-shaped divider extending forwardly with one of its arms connected to the divider support and its other arm connected to the reel support to engage a crop with a downward pressure.

14. The combination with a harvester having a reel support and a divider support, of a U-shaped divider extending forwardly of said divider support, one of the arms of said U-shaped divider being connected to the reel support and the other arm being connected to the divider support, said latter arm being shaped to exert a downward pressure on a crop.

15. The combination with a harvester comprising a transverse conveyor with a wind-board in the rear of said conveyor and a reel support extending forwardly from said wind-board, of a dividing member connected at one end to said reel support and at the other end to said conveyor, said dividing member extending forwardly and downwardly from said conveyor and exerting a downward pressure on a crop in advance of said conveyor.

16. The combination with a harvester comprising a transverse conveyor with a wind-board in the rear of said conveyor and a reel support extending forwardly from said wind-board, of a U-shaped divider having one arm connected to said conveyor and the other arm connected to said reel support, the intermediate portion of said divider extending forwardly and downwardly to exert a downward pressure on a crop in advance of said connections.

17. The combination with a harvester comprising a transverse conveyor having a divider support in advance of said conveyor and a wind-board in the rear thereof, and a reel support extending forwardly from said wind-board, of a U-shaped divider having one arm connected to said reel support and its other arm connected to said divider support, the intermediate portion of said divider being bowed outwardly and downwardly to engage a crop in advance of said divider support.

In witness whereof, I hereunto subscribe my name this 27th day of July, A. D. 1929.

PRENTICE L. HANS.